US009223793B1

(12) United States Patent
Mahalingam et al.

(10) Patent No.: US 9,223,793 B1
(45) Date of Patent: Dec. 29, 2015

(54) DE-DUPLICATION OF FILES FOR CONTINUOUS DATA PROTECTION WITH REMOTE STORAGE

(75) Inventors: Anandh Mahalingam, Fremont, CA (US); Narayanaswami Ganapathy, Newark, CA (US); Senthilkumar Ramasamy, Vriddhaehalam (IN)

(73) Assignee: American Megatrends, Inc., Norcross, GA (US)

( * ) Notice: Subject to any disclaimer, the term of this patent is extended or adjusted under 35 U.S.C. 154(b) by 918 days.

(21) Appl. No.: 12/793,178

(22) Filed: Jun. 3, 2010

Related U.S. Application Data

(60) Provisional application No. 61/183,746, filed on Jun. 3, 2009.

(51) Int. Cl.
*G06F 17/30* (2006.01)
(52) U.S. Cl.
CPC .............. *G06F 17/30156* (2013.01)
(58) Field of Classification Search
CPC .............. G06F 3/0641; G06F 11/1453; G06F 17/30153
USPC ........................................................ 707/695
See application file for complete search history.

(56) References Cited

U.S. PATENT DOCUMENTS

| 5,394,534 | A | * | 2/1995 | Kulakowski et al. | 711/112 |
| 5,574,906 | A | * | 11/1996 | Morris | 707/640 |
| 5,774,715 | A | * | 6/1998 | Madany et al. | 1/1 |
| 7,149,812 | B2 | * | 12/2006 | McCartney et al. | 709/247 |
| 8,135,683 | B2 | * | 3/2012 | Douglis et al. | 707/693 |
| 8,321,648 | B2 | * | 11/2012 | Condict | 711/170 |
| 2005/0131939 | A1 | * | 6/2005 | Douglis et al. | 707/103 Y |
| 2005/0165760 | A1 | * | 7/2005 | Seo | 707/3 |
| 2006/0230076 | A1 | * | 10/2006 | Gounares et al. | 707/200 |
| 2009/0307247 | A1 | * | 12/2009 | Pollack | 707/101 |
| 2012/0219233 | A1 | * | 8/2012 | Uro et al. | 382/239 |

* cited by examiner

*Primary Examiner* — James Trujillo
*Assistant Examiner* — Kurt Mueller
(74) *Attorney, Agent, or Firm* — Meunier Carlin & Curfman LLC

(57) ABSTRACT

Technologies are described herein for performing data de-duplication of a version of a data file for backup to a remote storage location. A CDP module executing on a computer creates a collection of files corresponding to the version of the data file by de-duplicating the version against a previous version master file stored locally on the computer. The previous version master file contains one or more unique data blocks of a specific block size from a previous version of the data file. Once the de-duplication against the locally maintained previous version master file is complete, the CDP module stores the collection of files corresponding to the version of the data file to the remote storage location. The remote storage location also contains a master file corresponding to the data file that contains all of the unique data blocks in the previous version master file.

15 Claims, 13 Drawing Sheets

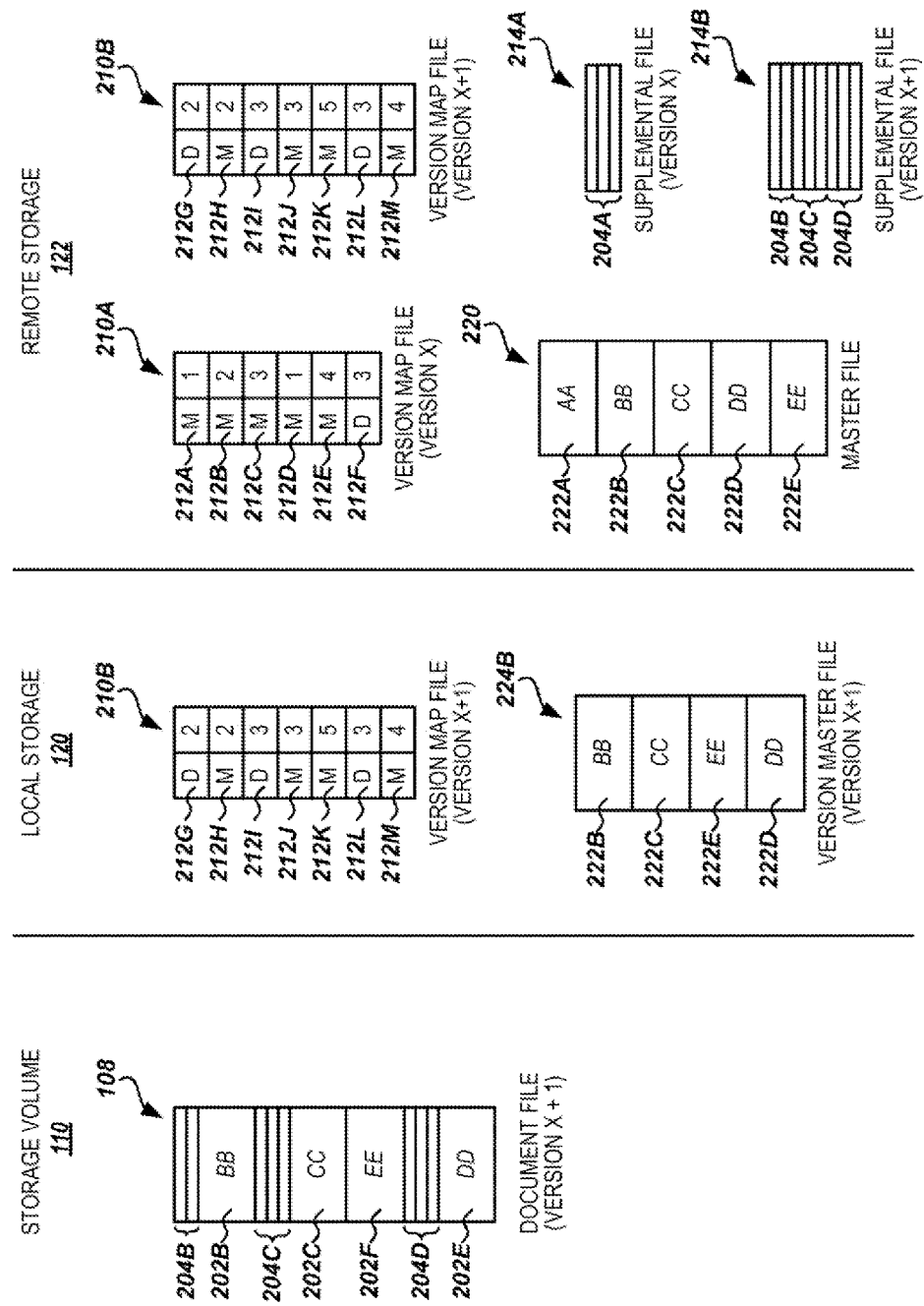

DE-DUPLICATION OF FILES FOR CONTINUOUS DATA PROTECTION WITH REMOTE STORAGE

CROSS-REFERENCE TO RELATED APPLICATION

This application claims the benefit of U.S. provisional patent application No. 61/183,746, filed on Jun. 3, 2009, entitled "A Novel Method of De-Duplication of Files for Remote Storage," which is expressly incorporated herein by reference in its entirety.

BACKGROUND

Continuous data protection ("CDP"), also called continuous backup, generally refers to the backup of data on a computer by automatically saving a copy of every change made to that data. While traditional backup solutions take a snapshot of the files or data on a computer at a specific time, CDP essentially captures every new version of the data saved on the computer in real-time. CDP may be performed at the file-level or the device-level. Device-level CDP generally allows a user or administrator to roll back the entire state of the device, such as a disk drive, to any point in time, while file-level CDP may allow a user to view and select a specific version of a particular data file to restore.

File-level CDP is typically implemented through a background service executing on a computer that monitors specified files and folders stored on local or remote storage volumes. When a monitored data file is changed, the new, modified version of the file is copied to one or more backup locations, such as internal storage, an external/removable storage device, and/or a remote storage system, such as a LAN-based storage server or a cloud-based storage service. While each new version of a data file may only differ from the previous versions by a small amount, traditional file-level CDP solutions may backup an entire copy of the modified version of the file. As a result, a small data file stored on the storage volume may occupy a disproportionately large amount of space in the backup location.

When utilizing a cloud-based storage service as a backup location, this large amount of space may make the cost of CDP prohibitive, since many cloud-based storage services charge a fee based on the amount of storage space utilized. It may be desirable for the CDP process to perform de-duplication of each new version of a monitored data file against previously stored versions in order to remove the duplicate data before backing up the file to the cloud-based storage service. However, de-duplication of the new version of the data file may require a significant amount of I/O against the previous version data stored on the cloud-based storage service. Since many of these services also charge a fee per I/O request or per amount of data transferred, the de-duplication process itself may increase the overall cost of the cloud-based storage service as a backup location.

It is with respect to these considerations and others that the disclosure made herein is presented.

SUMMARY

Technologies are described herein for performing data de-duplication of a version of a data file for backup to a remote storage location. Through the utilization of the technologies and concepts presented herein, a CDP module executing on a computer is able to perform de-duplication of each new version of a monitored data file against data maintained locally from a previous version of the file before backing-up the version to the remote storage, such as a cloud-based storage service. Performing the de-duplication before backing-up each new version of the data file allows for a minimal amount of space to be utilized on the remote storage for each new version, thus potentially reducing the overall cost of the CDP process. In addition, since a new version of the data file is likely to have more data in common with the previous version than with older versions of the file, maintaining data locally for the previous version allows for efficient de-duplication of the new version, while requiring less local storage space as compared to storing the entire version data for the data file locally. Maintaining the previous version data locally also allows the CDP module to perform the de-duplication with limited I/Os to the remote storage, thus further reducing costs associated with the CDP process.

According to one embodiment, the CDP module executing on a computer creates a collection of files corresponding to the new version of the data file by de-duplicating the new version of the data file against a previous version master file stored locally on the computer. The previous version master file contains one or more unique data blocks of a specific block size from the previous version of the data file. Once the de-duplication against the locally maintained previous version master file is complete, the CDP module stores the collection of files corresponding to the new version of the data file to the remote storage location. The remote storage also contains a master file corresponding to the data file that contains all of the unique data blocks in the previous version master file.

It should be appreciated that the above-described subject matter may also be implemented as a computer-controlled apparatus, a computer process, a computing system, or an article of manufacture, such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a block diagram showing aspects of a mechanism for storing multiple versions of a data file on a remote storage backup location, according to embodiments presented herein;

DETAILED DESCRIPTION

The following detailed description is directed to technologies for performing data de-duplication of a version of a data file for backup to a remote storage location. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
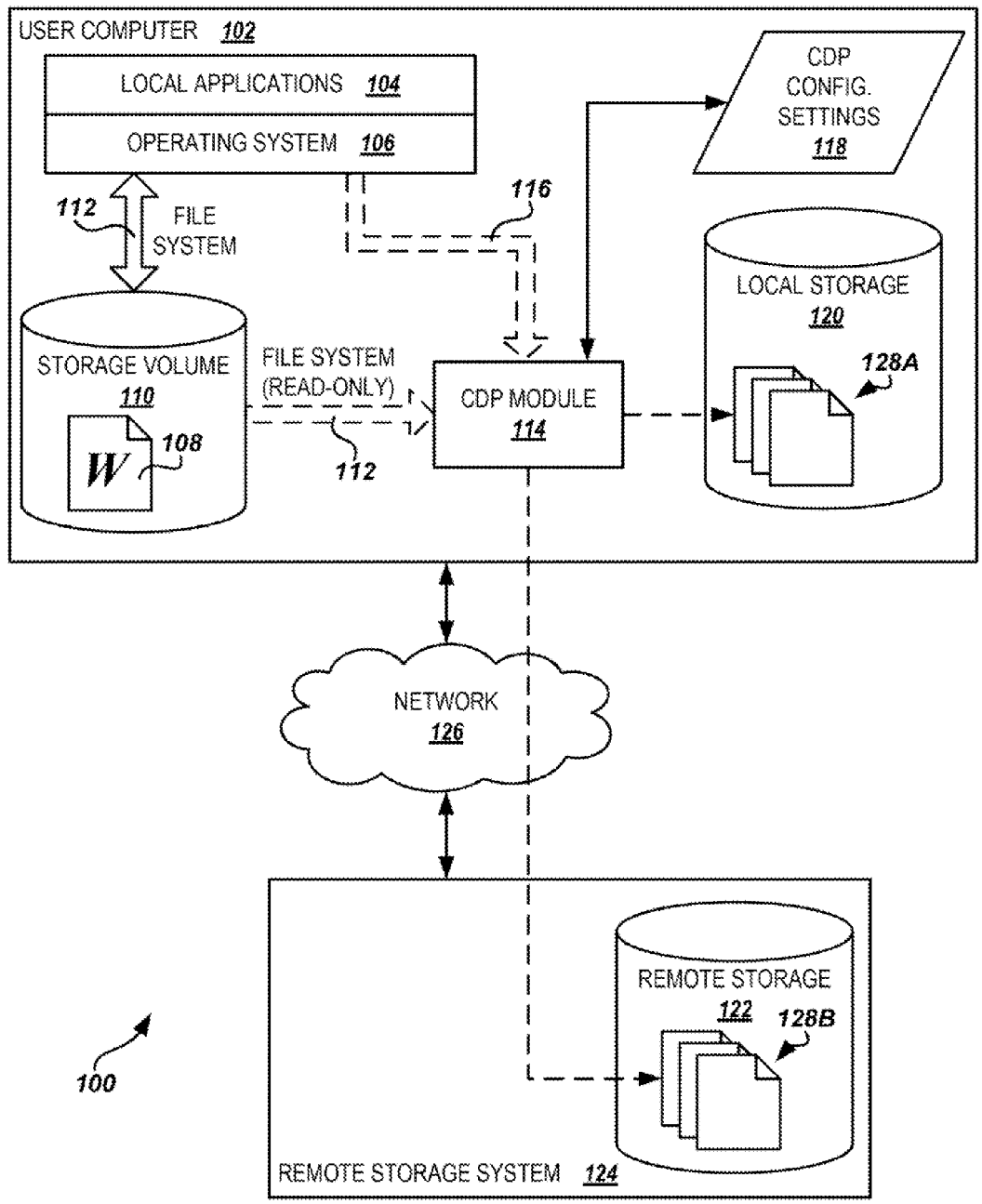
FIG. 1 is a block diagram showing aspects of an illustrative operating environment, including several software components provided by the embodiments presented herein.

FIG. 1 shows aspects of an illustrative operating environment 100 for the embodiments described herein, including a user computer 102. The user computer 102 may be a PC, a desktop workstation, a laptop, a notebook, a mobile device, a personal digital assistant ("PDA"), an application server, a Web server hosting Web-based application programs, or any other computing device. The user computer 102 executes local applications 104 and an operating system ("OS") 106 that read and write data files, such as the data file 108, stored on a storage volume 110.

The storage volume 110 may be located on a local storage device, such as a local hard drive, or the storage volume may be hosted on a remote storage system, such as a SAN volume or NAS volume accessed across a network 126 utilizing an appropriate protocol. The local applications 104 and the OS 106 may read and write data files 108 to the storage volume 110 utilizing a locally implemented file system 112, such as NTFS. It will be appreciated that the local applications 104 and the operating system 106 may utilize other file system 112 protocols to access the storage volume 110, including, but not limited to, the network file system ("NFS") protocol, the server message block ("SMB") protocol, and the like.

The user computer 102 also includes a continuous data protection ("CDP") module 114. The CDP module 114 executes on the user computer 102 and monitors specified files and folders on the storage volume 110 for changes in real-time. In one embodiment, the CDP module 114 utilizes "hooks" 116 provided by the OS 106 or the file system 112 of the user computer 102 to be notified of changes in the specified data files 108. In another embodiment, the CDP module 114 monitors the storage volume 110 directly through the file system 112 to detect changes to the specified data files 108. The CDP module 114 may provide facilities that allow users or administrators of the user computer 102 to specify which data files 108 on the storage volume 110 to monitor. The users or administrators may specify folder names, file names, file types, or any other specification of files to monitor. The specification of the files to monitor may be stored in CDP configuration settings 118 maintained on the user computer 102, for example.

When a monitored data file 108 is changed on the storage volume 110, the CDP module 114 initiates the CDP process to backup the modified version of the file to one or more backup locations. The backup locations may include a local storage device 120, such as a local hard drive or tape drive, and/or remote storage 122 provided by a remote storage system 124 accessed across the network 126, such as a cloud-based storage service provided over the Internet. The CDP module 114 may further provide facilities that allow the users or administrators of the user computer 102 to specify the one or more backup locations for the backups, a schedule for periodic backups of the current versions of the monitored data files 108, a maximum number of versions of each data file that are to be maintained in the backup locations, and the like. These settings may further be stored in the CDP configuration settings 118 described above.

Figure 2:
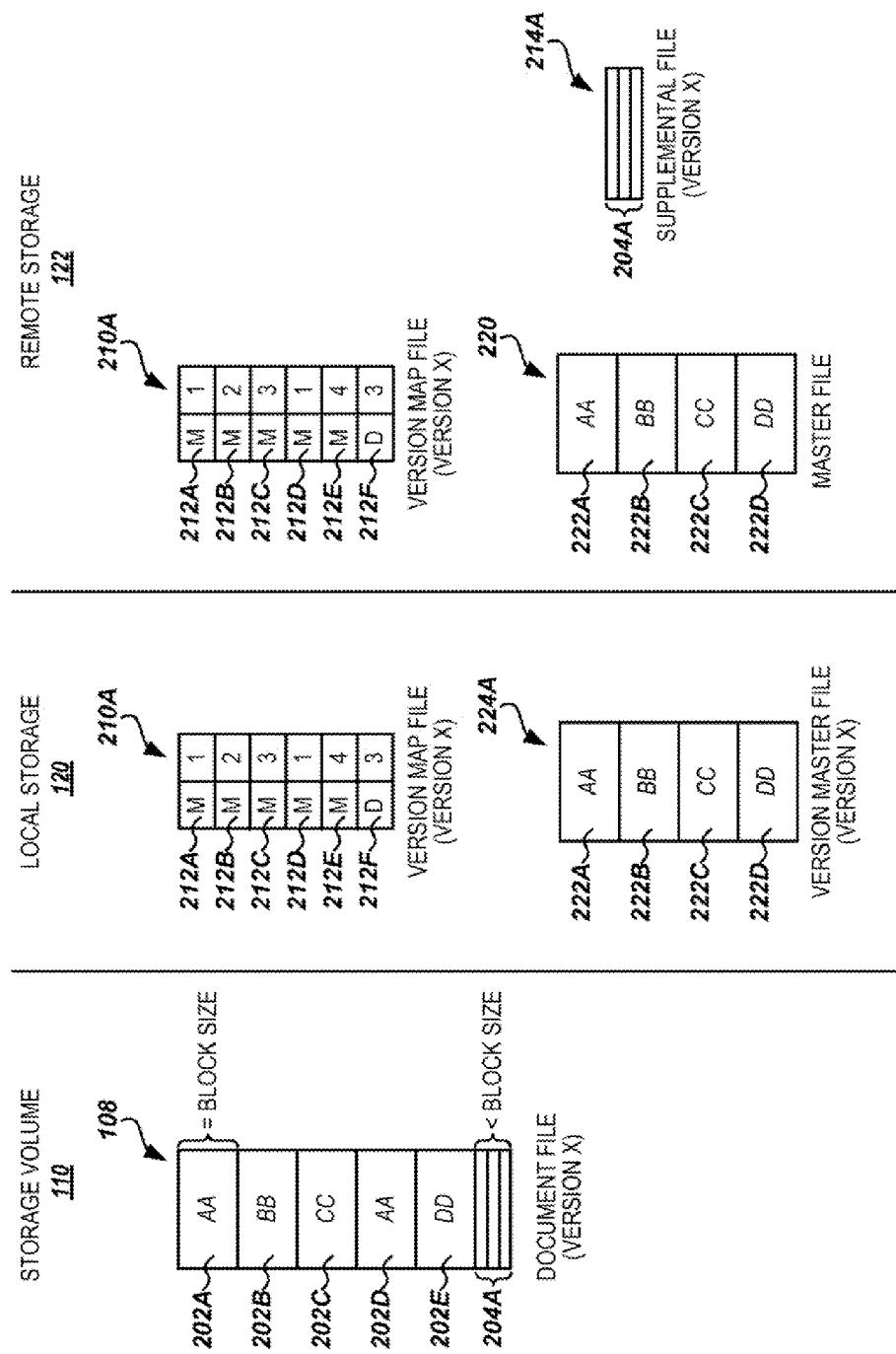
FIG. 2 is a block diagram showing aspects of a mechanism for storing a version of a data file on a remote storage backup location, according to embodiments presented herein.

According to embodiments, the CDP module 114 maintains a collection of files 128A, 128B in the backup location (s) that stores the versions of the monitored data file 108. FIG. 2 shows additional details of the collection of files 128B utilized by the CDP module 114 to store versions of the data file 108 to a remote storage 122 backup location, such as a cloud-based storage service. According to one embodiment, for each monitored data file 108, the collection of files 128B maintained by the CDP module 114 in the remote storage 122 includes a master file 220. In addition, for each backed-up version of the data file 108, the collection of files 128B also includes a version map file 210A (referred to herein generally as version map file 210) and a supplemental file 214A (referred to herein generally as supplemental file 214).

Each of the files 220, 210, 214 in the collection of files 128B may be stored in the remote storage 122 with a filename related to the name and/or version of the corresponding data file 108, for example. Alternatively, the files 220, 210, 214 in the collection of files 128B may be linked to the corresponding data file 108 through a mechanism other than the filename, such as through a catalog file. It will be appreciated that the master file 220, version map files 210, and supplemental files 214 may represent virtual files that are physically stored in the remote storage 122 in a container other than files in a file system, such as rows in a database table. It is intended that this application include all such implementations of the collection of files 128B.

The master file 220 is common to all versions of the corresponding data file 108 and contains a number of master blocks 222A-222D (referred to herein generally as master block 222). Each master block 222 in the master file 220 contains a unique block of data from the data file 108. Each unique master block 222 is stored only once in the master file 220, even though the block of data may occur multiple times in the original data file 108. For example, as shown in FIG. 2, a version X of the data file 108 may consist of a number of blocks of data 202A-202E of a specific block size. The block size may be selected based on the file system 112 being utilized to allow efficient reading and writing of data while maximizing the de-duplication of data in the collection of files 128B. For the NTFS file system, the block size may be 512 bytes, corresponding to the sector size of a standard PC hard disk. In addition, the version X of the data file 108 may contain a chunk of data less than the block size, such as the chunk of data 204A (referred to herein generally as chunk of data 204), as further shown in FIG. 2.

The master file 220 corresponding to the data file 108 will contain the unique master block 222A, corresponding to blocks of data 202A and 202D in the data file, unique master block 222B, corresponding to block of data 202B, unique master block 222C corresponding to block of data 202C, and unique master block 222D corresponding to block of data 202E. Storing only unique blocks of data from the data file 108 in the master file 220 reduces the storage space required as compared to simply copying the version of the data file 108 to the remote storage 122. In addition, this technique provides even greater storage space savings when storing subsequent versions of the data file 108, as will become apparent from the description below. The chunk of data 204A from the data file 108 that is less than a full block of data is stored in the supplemental file 214A for the corresponding version X of the data file.

The version map file 210 maintained for each backed-up version of the data file 108 contains a list of references 212A-212F (referred to herein generally as reference 212). Each of the references 212 is either a master block reference or a supplemental data reference. Master block references 212, as indicated by an "M" in the reference in FIG. 2, refer to a specific master block 222 in the master file 220 corresponding to the data file 108. The master block reference 212 contains as index to the master block 222 in the master file 220. Supplemental data references 212, as indicated by a "D" in the reference, refer to a chunk of data 204 in the supplemental file 214 corresponding to the version of the data file 108. The supplemental data reference 212 contains a length of the chunk of data 204 in the supplemental file 214. In one embodiment, the length may represent a number of bytes of data in the chunk of data 204.

The references 212 appear in the version map file 210 in the order in which the corresponding master block 222 or chunk of data 202 appear in the version of the data file 108. For example, as shown in FIG. 2, the version map file 210A corresponding to version X of the data file 108 contains a master block reference 212A referring to unique master block 222A, a master block reference 212B referring to unique master block 222B, a master block reference 212C referring to unique master block 222C, a master block reference 212D referring again to unique master block 222A, a master block reference 212E referring to unique master block 222D, and a supplemental data reference 212F referring to the chunk of data 204A contained in the corresponding supplemental file 214A and consisting of 3 bytes of data.

While the users or administrators of the user computer 102 may specify that the CDP module 114 should backup new versions of the monitored data files 108 to remote storage 122, the CDP module may retain some backup data in the collection of files 128A on the local storage device 120. According to embodiments, the CDP module 114 maintains the version map file 210A and a version master file 224A corresponding to the previous version of the data file 108, i.e. the last backed-up version of the file, on the local storage device 120. The previous version map file 210A and the previous version master file 224A may be utilized by the CDP module 114 for performing de-duplication of data in each new version of the data file 108 before storing the corresponding version map file 210 and supplemental file 214 to the remote storage, as will be described in more detail below in regard to FIGS. 3A-3E, 6, and 7A-7B. Maintaining the previous version map file 210A and previous version master file 224A corresponding to the last backed-up version of the data file 108 allows the CDP module 114 to perform the de-duplication with limited I/Os to the remote storage 122, thus potentially reducing costs associated with the CDP process.

Figure 3A:
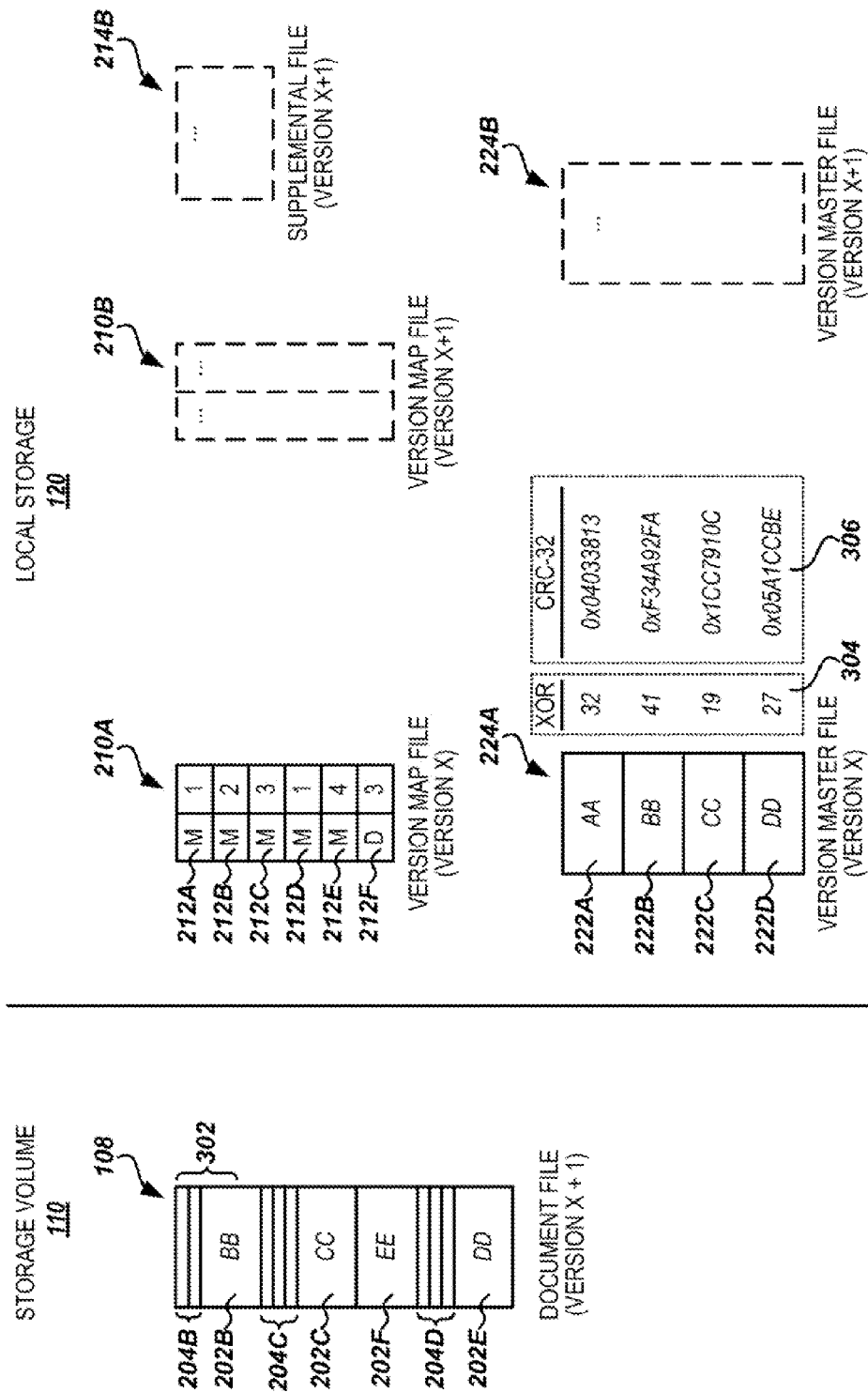
FIGS. 3A-3E are block diagrams showing aspects of a mechanism for de-duplicating a new version of a data file against a previous version of the file, according to embodiments presented herein.

FIGS. 3A-3E show aspects of a mechanism for performing de-duplication of data in a new version of the data file 108 against the previous version map file 210A and previous version master file 224A corresponding to the last backed-up version of the file. The CDP module 114 may perform the de-duplication before backing-up the new version of the data file 108 to the remote storage 122 in order to reduce the amount of data usage on the remote storage, and thus potentially reducing costs associated with the CDP process. As shown in FIG. 3A, the new version X+1 of the data file 108 may consist of a chunk of data 204B consisting of two bytes, a full block of data 202B matching the master block 222B in the master file 220 corresponding to the data file, a chunk of data 204C consisting of three bytes, a full block of data 202C matching the master block 222C, a full block of data 202F not matching any master blocks in the master file 220, another chunk of data 204D consisting of three bytes of data, and a full block of data 202E matching the master block 222D.

In order to backup the new version X+1 of the data file 108 to the remote storage 122, the CDP module 114 first builds a new version map file 210B and new supplemental file 214B corresponding the new version X+1 by performing the data de-duplication process against the previous version master file 224A corresponding to the previous version X of the data file. In one embodiment, the CDP module 114 utilizes the method described below in regard to FIGS. 7A and 7B. The CDP module 114 starts by reading a data block 302 of the block size described above from the top of the data file 108. The data block 302 is then compared against the master blocks 222A-222D contained in the previous version master file 224A.

According to one embodiment, the CDP module 114 maintains lightweight checksums 304 and heavyweight checksums 306 for each master block 222 in the master file 220 corresponding to the data file 108. The CDP module 114 may maintain the lightweight checksums 304 and heavyweight checksums 306 in a table on the local storage device 120 indexed by the corresponding master block index in the master file 220, for example. In another embodiment, the lightweight checksums 304 and heavyweight checksums 306 may be calculated by the CDP module 114 for each master block 222A-222D in the previous version master file 224A stored on the local storage device 120 at the beginning of the CDP process. The lightweight checksums 304 may consist of an XOR checksum calculated for the corresponding master block 222, while the heavyweight checksums 306 may consist of 32-bit CRC checksums for the master blocks. It will be appreciated that any checksum calculation algorithm known in the art may be utilized by the CDP module 114 to calculate the checksum values for the master blocks 222

In order to compare the data block 302 with the master blocks 222A-222D contained in the previous version master file 224A, the CDP module 114 first calculates a lightweight checksum value for the data block 302 and then searches the lightweight checksums 304 for the master blocks for a matching value. If a match is found, the CDP module 114 checks the corresponding heavyweight checksum 306 for the candidate master block 222 against a similarly calculated heavyweight checksum for the data block 302. If the heavyweight checksums match, then the CDP module 114 finally performs a byte-by-byte comparison between the data block 302 and the candidate master block 222 in order to determine if the master block matches the data block. In another embodiment, the CDP module 114 may check only the lightweight checksums 304, and upon finding a match, perform the byte-by-byte comparison between the data block 302 and the candidate master block 222.

Figure 3B:
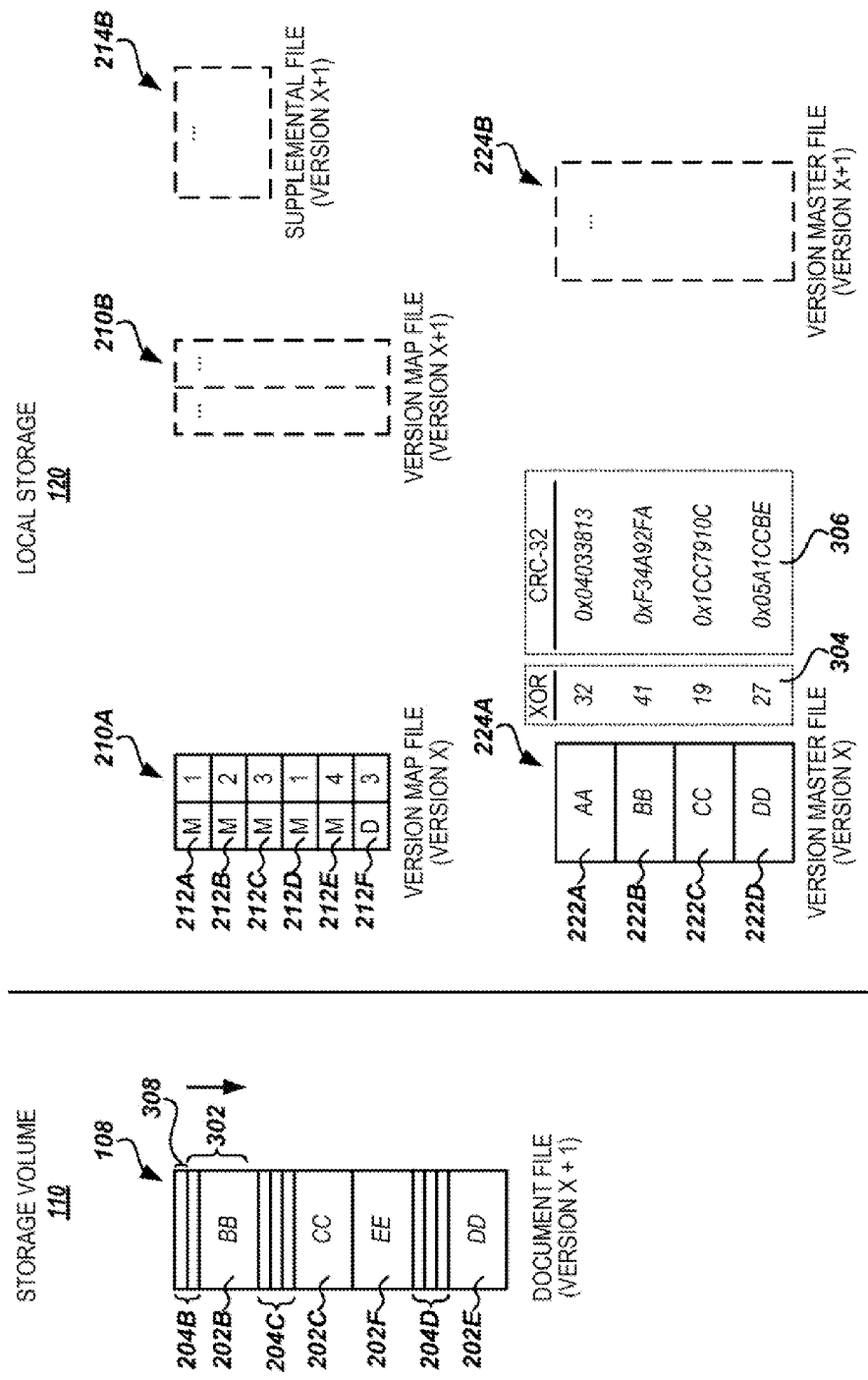

If no matching master block 222A-222D in the previous version master file 224A is located for the read data block 302, then the CDP module 114 reads another data block 302 of the block size at an offset from the top of the data file 108 equal to a slide size 308, as shown in FIG. 3B. In one embodiment, the slide size 308 is one byte. It will be appreciated that other slide sizes 308 may be utilized, and that the slide size may be configurable by the users or administrators of the user computer 102. The data block 302 read at the offset is again compared to the master blocks 222A-222D contained in the previous version master file 224A. The process is continued until the read data block 302 matches one of the master blocks 222A-222D in the previous version master file 224A. For example, as shown in FIG. 3C, the data block 302 containing the block of data 202B from the new version X+1 of the data file 108 matches the master block 222B in the previous version master file 224A for the previous version X.

Figure 3C:
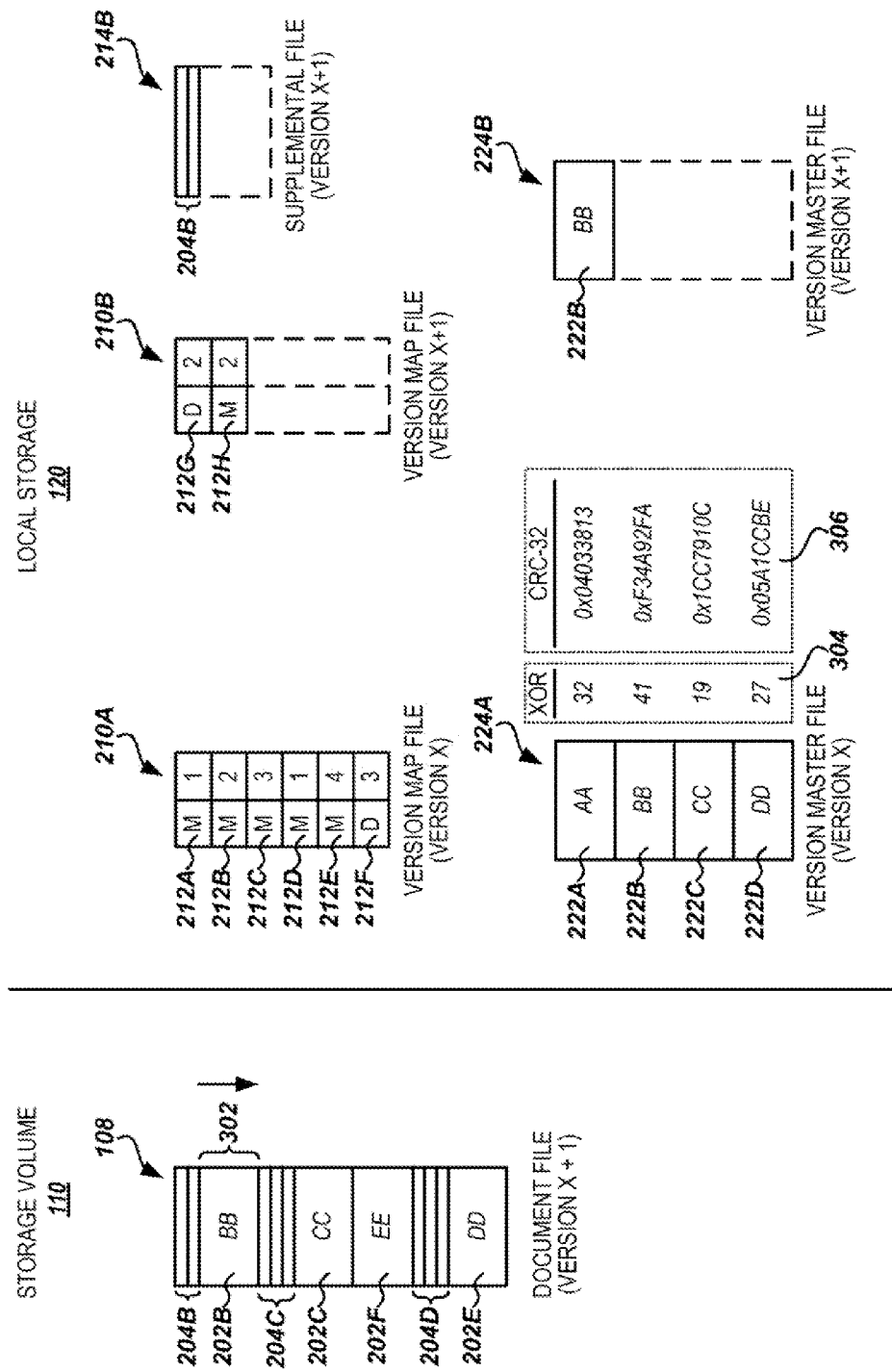

If a matching master block 222B is found for the read data block 302, then the CDP module 114 first appends any skipped chunk of data 204B read before the matched data block to the new supplemental file 214B for the new version X+1 of the data file 108, as further shown in FIG. 3C. The CDP module 114 then appends a corresponding supplemental data reference 212G to the version map file 210B for the new version X+1 of the data file 108. The supplemental data reference 212G indicates the length of the skipped chunk of data 204B in the supplemental file 214B as two bytes in this example.

Next, the CDP module 114 appends a master block reference 212H to the version map file 210B for the new version X+1 of the data file 108 indicating the matching master block 222B. According to embodiments, the index in master block reference 212H indicates the index of the matching master block 222B in the master file 220, not the index of the master block 222B in the previous version master file 224A maintained on the local storage device 120. The CDP module 114 may determine the index of the matching master block 222B in the master file 220 utilizing the master block reference 212B from the previous version map file 210A corresponding to the position of the matching master block 222B in the previous version master file 224A, for example.

In one embodiment, the CDP module 114 also builds a new version master file 224B for the new version X+1 of the data file 108 during the de-duplication process by appending each matching unique master block 222B from the previous version master file 224A in the order in which they are matched to the new version X+1 of the data file. In another embodiment, the CDP module 114 may build the new version master file for version X+1 of the data file at the end of the CDP process utilizing the current version X+1 of the data file 108 and the corresponding new version map file 210B. It will be appreciated that, because a new version of the data file 108 is likely to have more data in common with the previous version than older versions of the file, maintaining a version master file 224A for the previous version on the local storage device 120 allows for efficient de-duplication of data in the new version while requiring less local storage space as compared to storing the entire master file 220 on the local storage device. However, some master blocks 222 may eventually be duplicated in the master file 220 as more versions of the data file 108 are backed-up to the remote storage 122.

Figure 3D:
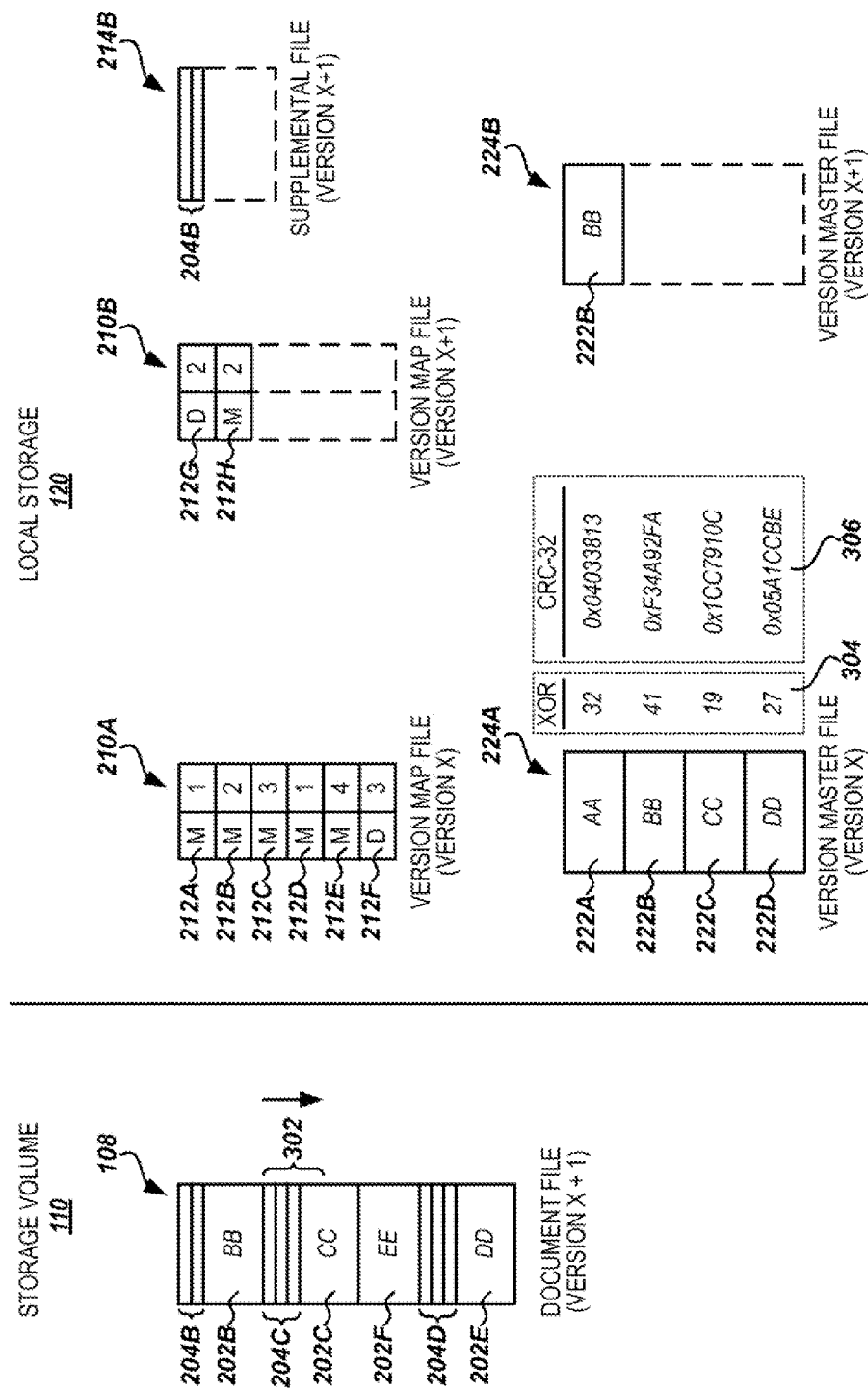

After appending the master block reference 212H for the matching master block 222B to the version map file 210B, the CDP module 114 then reads the next full data block 302 from the data file 108 starting at the position at the end of the block of data 202B that matched the master block, as is shown in FIG. 3D. The processing of the new version X+1 of the data file 108 continues until the entire file has been read, resulting in the version map file 210B, supplemental file 214B, and version master file 224B corresponding to the new version X+1 of the data file 108 shown in FIG. 3E. Note that when a full block of data, such as the block of data 202F, has been skipped in the data file 108 without finding a matching master block 222, the full block of data 202F is appended as a new master block 222E to the version master file 224B in the appropriate position. The new master block 222E is further referenced by a master block reference 212K in the version map file 210B with an index indicating the eventual position of the new master block in the master file 220.

Once processing of the new version X+1 of the data file 108 is complete, the new version map file 210B and the new supplemental file 214B corresponding to the new version X+1 are stored to the remote storage 122, as shown in FIG. 4. In addition, any new master blocks 222E are appended to the master file 220 in the remote storage 122 in the appropriate order. The CDP module 114 further replaces the version map file 210A and version master file 224A for the previous version X of the data file 108 maintained on the local storage device 120 with the new version map file 210B and new version master file 224B for the new version X+1 of the file.

Figure 5:
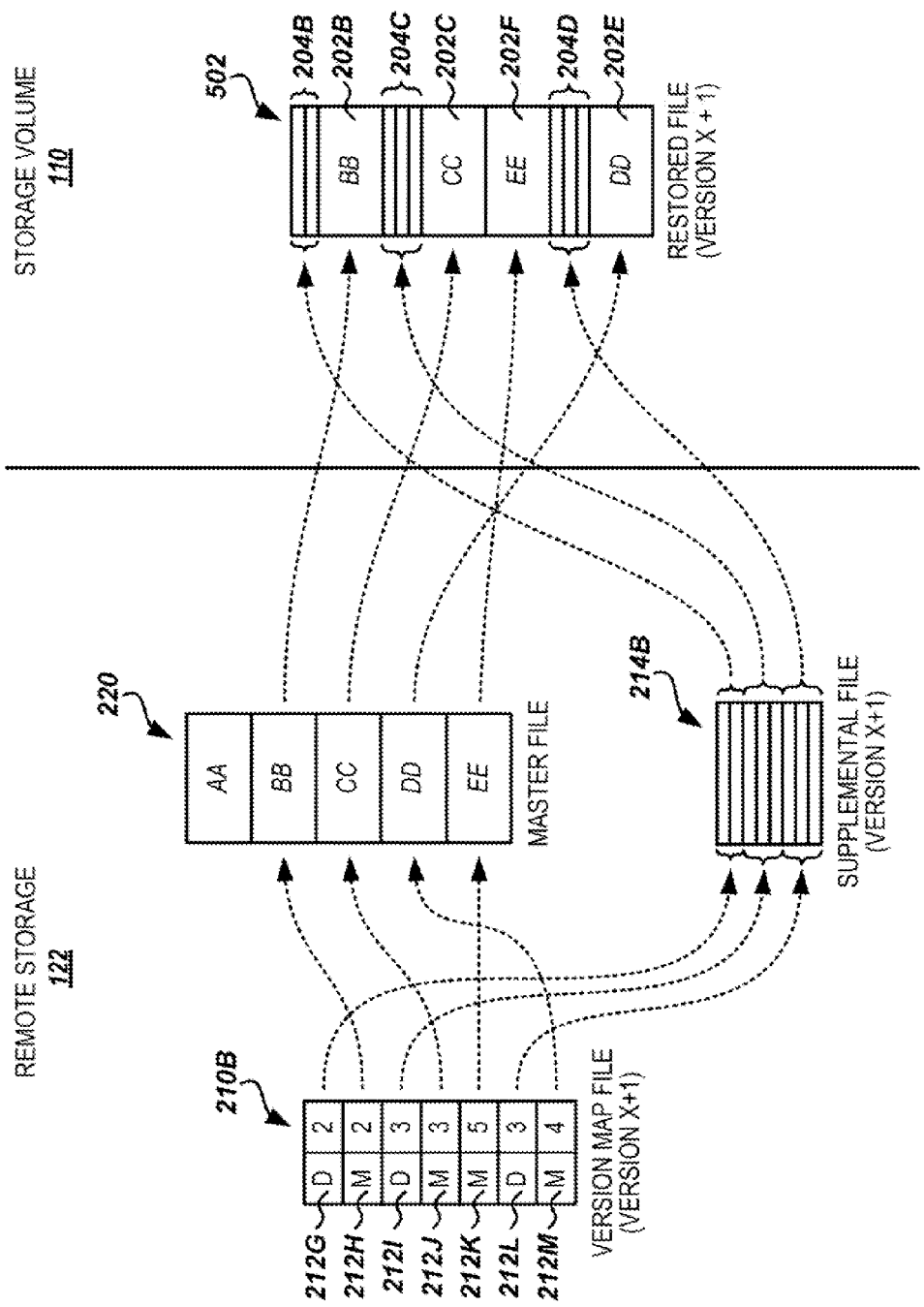
FIG. 5 is a block diagram showing a mechanism for rebuilding a particular version of a data file from a collection of files storing multiple versions of the file, according to embodiments presented herein.

FIG. 5 illustrates how a particular version of the data file 108 may be recovered or restored by the CDP module 114 from the corresponding collection of files 128B maintained in the remote storage 122, according to one embodiment. In the illustrated example, the version X+1 of the data file 108 described above is recovered from the version map file 210B and supplemental file 214B corresponding to the version and the master file 220 corresponding to the data file. The CDP module 114 builds the recovered version of the data file 108 by processing the references 212G-212M in the version map file 210B in order of their occurrence.

As shown in the figure, the CDP module 114 first appends a two byte chunk of data 204B from the supplemental file 214B to a restored file 502, as indicated by the supplemental data reference 212G. Then the second master block 222B from the master file 220 is appended to the restored file 502, as indicated by the master block reference 212H. Next, the CDP module 114 appends a three byte chunk of data 204C from the supplemental file 214B to the restored file 502, as indicated by the supplemental data reference 212I. The CDP module 114 continues in this fashion until each of the remaining references 212J-212M in the version map file 210B have been processed and the restored file 502 is complete.

Figure 6:
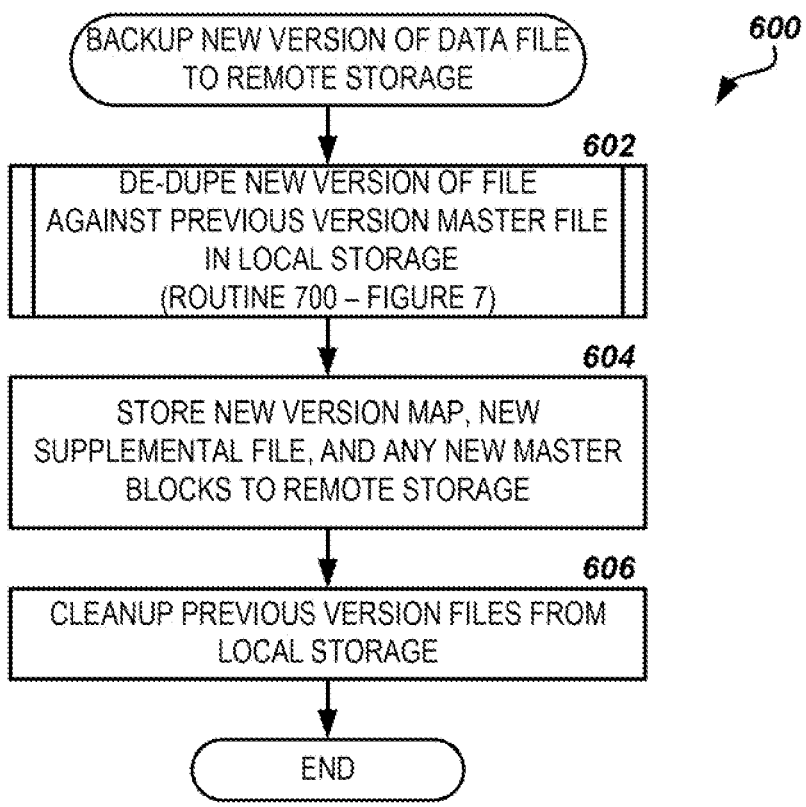
FIG. 6 is a flow diagram illustrating one method for backing up a new version of a data file to a remote storage backup location, according to embodiments presented herein.
Figure 7A:
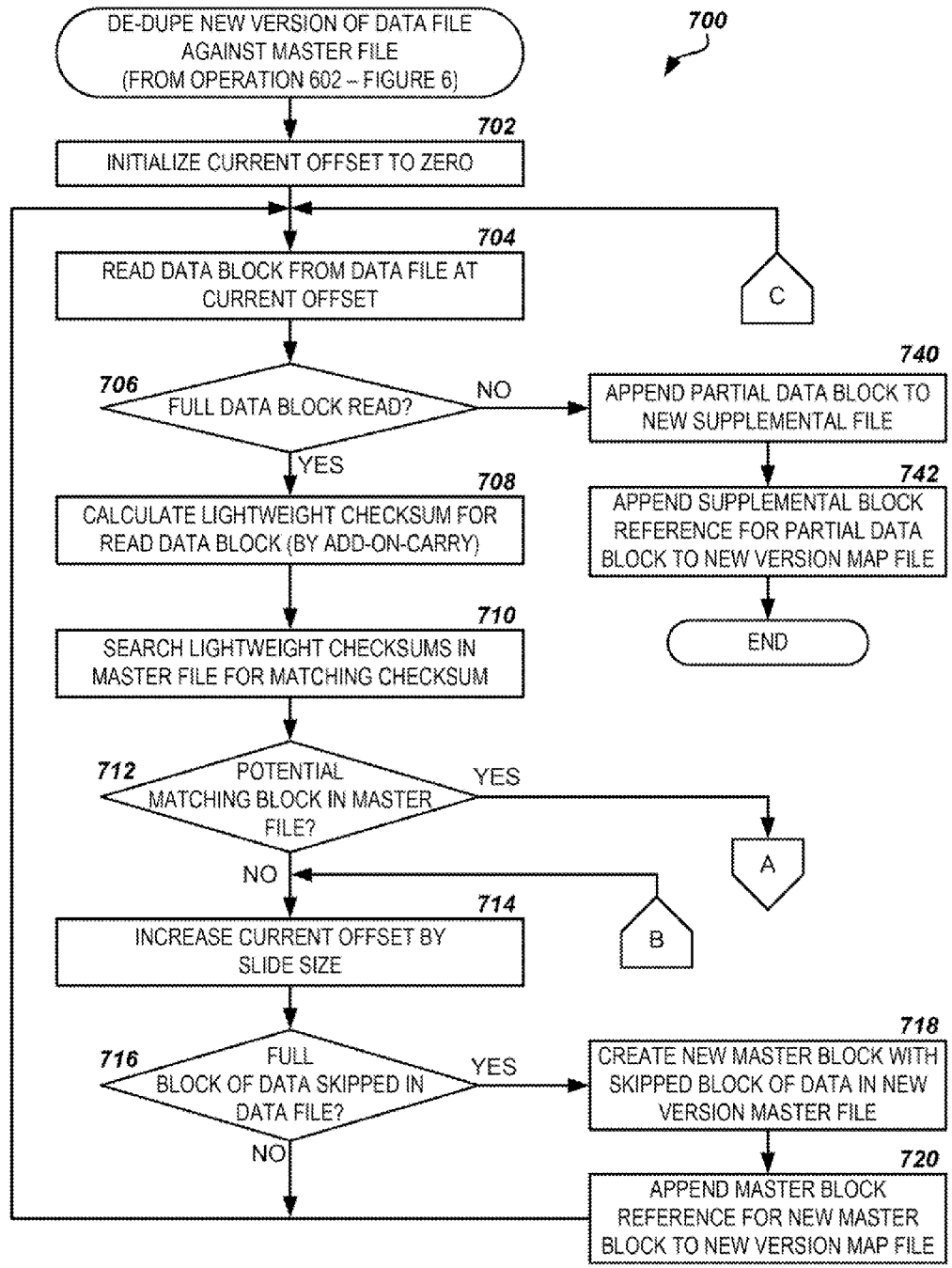
FIGS. 7A-7B are logical flow diagrams illustrating one method for performing de-duplication of a new version of a data file against a previous version, according to embodiments presented herein.
Figure 7B:
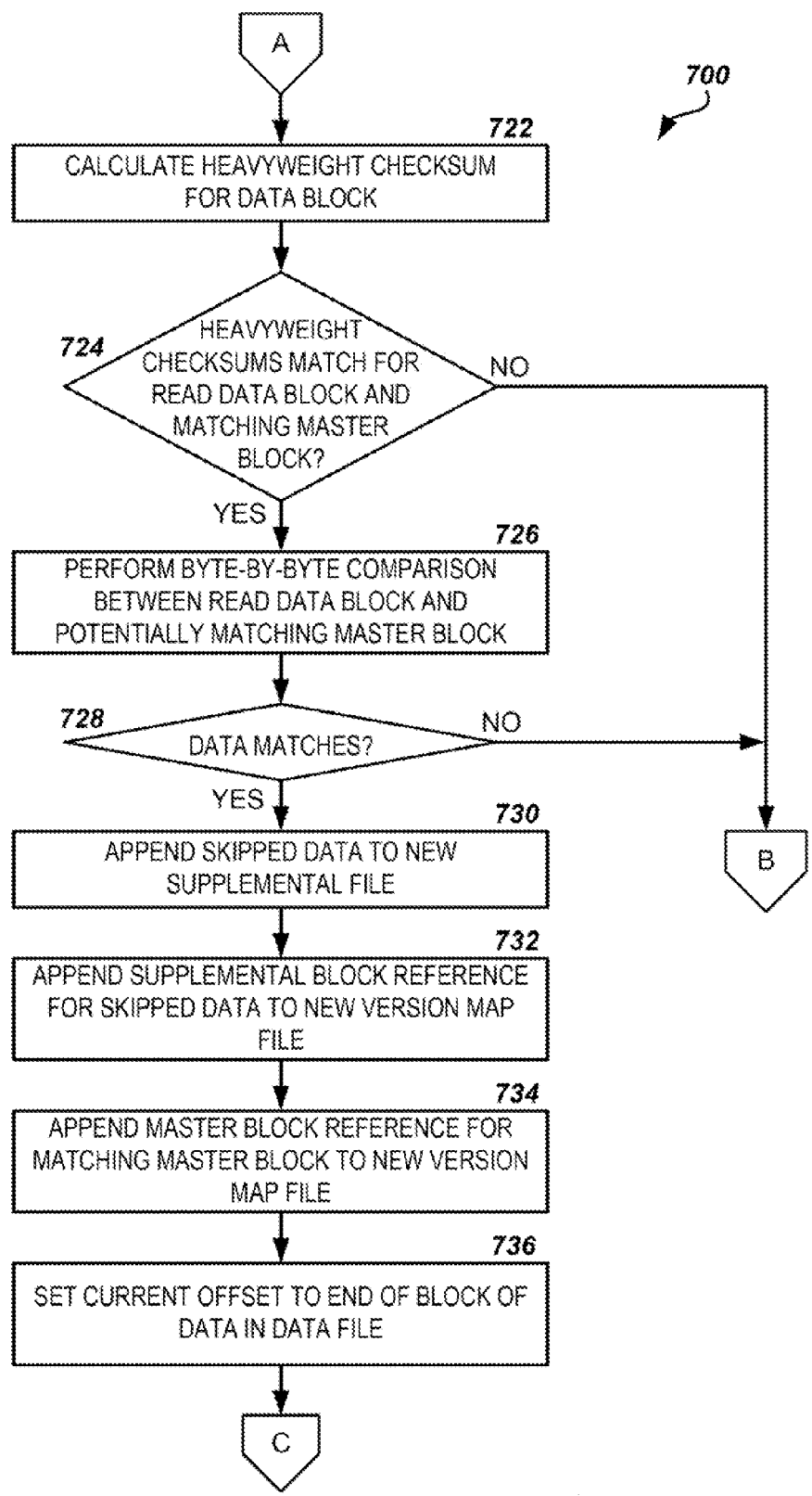

Turning now to FIGS. 6-7B, additional details will be provided regarding the embodiments presented herein for performing data de-duplication of a version of a data file for backup to a remote storage location. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 6 shows a routine 600 for backing up the current version X+1 of a data file 108 to the remote storage 122, according to one embodiment. The routine 600 may be executed by the CDP module 114 on the user computer 102, or the routine may performed by another module or a combination of modules executing on the user computer 102 and remote storage systems. In one embodiment, the routine 600 may be executed by the CDP module 114 upon detection of a modification to a monitored data file 108 on the storage volume 110. The modification to the data file 108 may be the result of a user of the user computer 102 saving a file within a local application 104, or the OS 106 modifying the file in the course of operation, for example.

As described above in regard to FIG. 1, the CDP module 114 may detect the modification to the data file 108 by receiving a message from a hook 116 provided by the OS 106 or by detecting the change to the file through the file system 112 on the user computer 102. In other embodiments, the CDP module 114 may initiate the routine 600 in response to a trigger other than a modification to the data file 108. For example, the CDP module 114 may backup the current version of each monitored data file 108 on the storage volume 110 to the remote storage 122 on a periodic basis, regardless of whether the data file has been modified.

The routine 600 begins with operation 602, where the CDP module 114 performs de-duplication of the data in the new version X+1 of the data file 108 against the master file 224A for the last backed-up version X of the data file located on the local storage device 120. According to one embodiment, the CDP module 114 utilizes the routine 700 described below in regard to FIGS. 7A-7B to perform the de-duplication process. The output of the de-duplication process may be a new version map file 210B, a new supplemental file 214B, and a new version master file 224B corresponding to the version X+1 of the data file 108, as described above in regard to FIGS. 3A-3E.

From operation 602, the routine 600 proceeds to operation 604, where the CDP module 114 stores the new version map file 210B, the new supplemental file 214B, and any new master blocks 222E generated during the de-duplication process of the new version X+1 of the data file 108 to the remote storage 122, as described above in regard to FIG. 4. The routine 600 then proceeds to operation 606, where the CDP module 114 cleans-up the files related to the previous version X of the data file in the collection of files 128A maintained on the local storage device 120. This may include replacing the previous version map file 210A and previous version master file 224A maintained on the local storage device 120 with the new version map file 210B and new version master file 224B, as further shown above in FIG. 4. From operation 606, the routine 600 ends.

FIGS. 7A-7B show a routine 700 for performing de-duplication of a new version X+1 of a data file 108 against the previous version master file 224A corresponding to the previous version X of the file, according to one embodiment. The routine 700 may be executed by the CDP module 114 on the user computer 102, or the routine may performed by another module or a combination of modules executing on the user computer 102 and remote storage systems.

As shown in FIG. 7A, the routine 700 begins with operation 702, where the CDP module 114 initializes the current offset to zero, indicating the CDP module 114 will begin processing of the data file 108 from the top of the file. The routine 700 then proceeds from operation 702 to operation 704, where the CDP module 114 reads the first data block 302 from the data file 108 at the current offset. From operation 704, the routine 700 proceeds to operation 706, where the CDP module determines if a full data block 302 was read from the data file 108, i.e. the size of the read block is not less than the block size. If a full data block 302 was read, then the routine 700 proceeds to operation 708, where the CDP module 114 calculates a lightweight checksum for the read data block 302.

As described above in regard to FIG. 3A, the CDP module 114 may utilize a simple XOR checksum calculation for the lightweight checksum. For the first data block 302 read from the data file 108, the CDP module 114 may be required to compute the lightweight checksum with all bytes of the data block. However, for subsequent data blocks 302, the lightweight checksum value may be calculated from the previous checksum using an add-on carry algorithm, according to one embodiment. For example, for a slide size 308 of one byte and a block size of 512 bytes, the CDP module 114 can calculate the lightweight checksum value for the second data block 302 read from the data file 108 by subtracting the dropped byte (byte 1) from the lightweight checksum value for the first data block and then add the new byte (byte 513) from the new data block. Utilizing the add-on carry algorithm to calculate subsequent checksum values may significantly increase the performance of the CDP process.

From operation 708, the routine 700 proceeds to operation 710, where the CDP module 114 searches for the calculated checksum value in the lightweight checksums 304 maintained for the master blocks 222 in the previous version master file 224A to determine if any master block potentially matches the data block 302. If, at operation 712, no potential matching master blocks 222 are found, the routine 700 proceeds to operation 714, where the CDP module 114 increases the current offset by the slide size 308, as described above in regard to FIG. 3B.

Figure 3E:
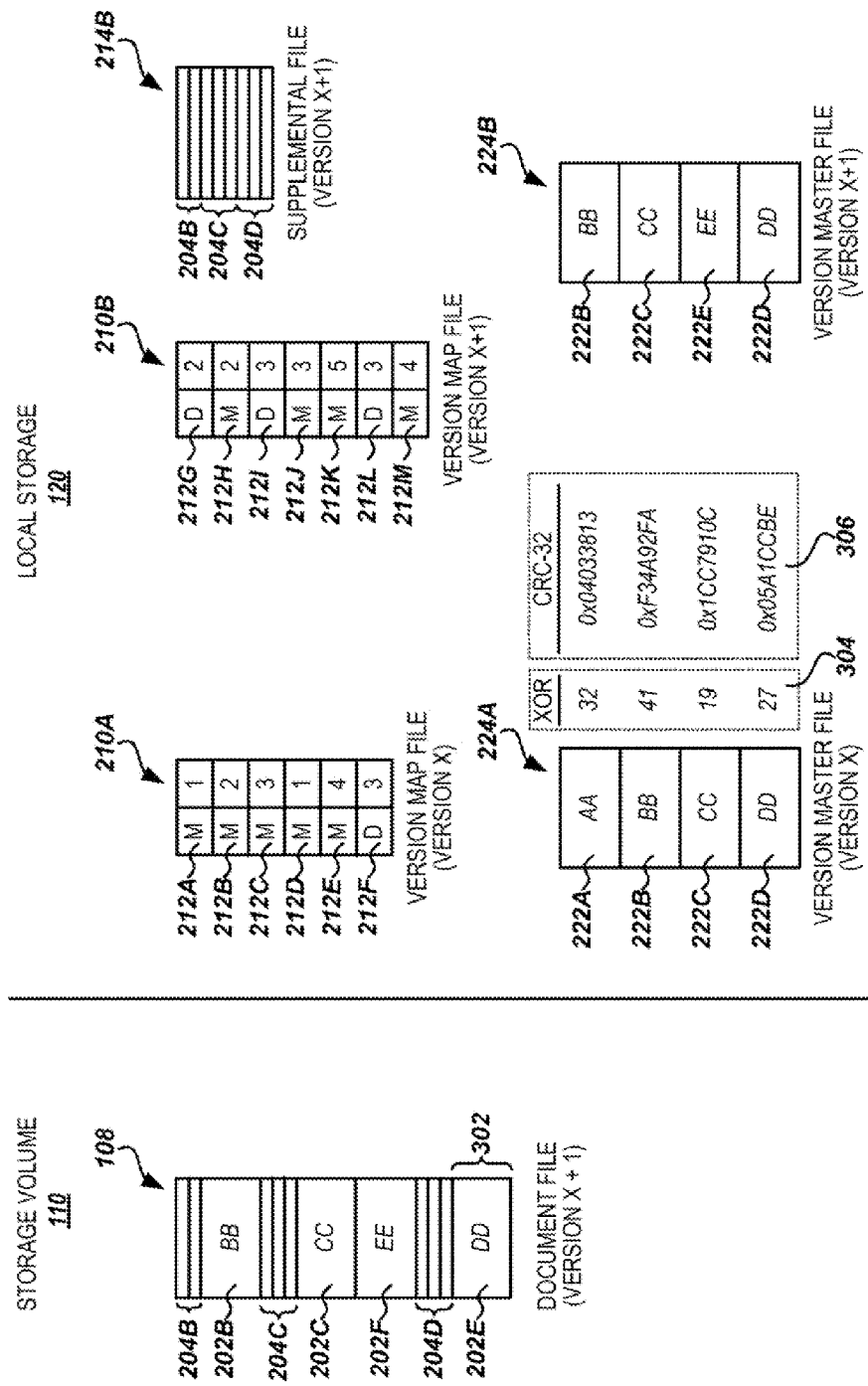

The routine 700 proceeds from operation 714 to operation 716, where the CDP module 114 determines whether a full block of data, such as the block of data 202F shown in FIG. 3E, has been skipped in the data file 108 without finding a matching master block 222 in the previous version master file 224A. If a full block of data, i.e. a number of bytes of data equal to the block size, has been skipped by the CDP module 114 without finding a matching master block 222, then the routine 700 proceeds from operation 716 to operation 718, where the skipped block of data 202F is appended as a new master block 222E to the new version master file 224B. The routine 700 then proceeds to operation 720, where the CDP module 114 appends a corresponding master block reference 212K to the new version map file 210B with an index indicating the eventual position of the new master block 222E in the master file 220 in the remote storage 122, as described above in regard to FIG. 3E.

From operation 718, the routine 700 returns to operation 704, where the next data block 302 is read from the data file 108 at the current offset. The process continues until a master block 222 with a lightweight checksum 304 matching the checksum value calculated for the read data block 302 is located, or until a data block 302 less than a full block is read. If, at operation 712, a potentially matching master block 222B is located in the in the previous version master file 224A, the operation proceeds to operation 722, as shown in FIG. 7B, where the CDP module 114 calculates a heavy-weight checksum for the read data block 302. As described above in regard to FIG. 3A, the CDP module 114 may utilize a more complex 33-bit CRC checksum calculation for the heavyweight checksum.

The routine 700 proceeds from operation 722 to operation 724, where the CDP module 114 determines whether the heavyweight checksum value calculated for the read data block 302 matches the heavyweight checksum 306 maintained for the potentially matching master block 222B, as described above in regard to FIG. 3A. If the heavyweight checksum value calculated for the read data block 302 does not match the heavyweight checksum 306 maintained for the potentially matching master block 222B, the routine 700 returns to operation 714, show in FIG. 7A, where the CDP module 114 increases the current offset by the slide size 308 and proceeds to read the next data block 302 from the data file 108.

Use of the heavyweight checksum comparison may provide a more efficient means of verifying the similarity between the potentially matching master block 222B and the read data block 302 before resorting to a more costly byte-by-byte comparison of the read data block and the master block, thus saving CPU time. In an alternative embodiment, the heavyweight checksum comparison operation may be skipped, with the CDP module 114 moving to a byte-by-byte comparison on any master block 222 having a lightweight checksum 304 matching the lightweight checksum value calculated for the read data block 302.

If the heavyweight checksum value calculated for the read data block 302 does match the heavyweight checksum 306 maintained for the potentially matching master block 222B, then routine 700 proceeds from operation 724 to operation 726, where the CDP module 114 performs a byte-by-byte comparison between the read data block 302 and the potentially matching master block 222B to ensure the data between the two matches. If, at operation 728, the data doesn't match, the routine 700 returns to operation 714, show in FIG. 7A, where the CDP module 114 increases the current offset by the slide size 308 and proceeds to read the next data block 302 from the data file 108.

If the data between the read data block 302 and the potentially matching master block 222B does match, then the routine 700 proceeds from operation 728 to operation 730, where the CDP module 114 appends any skipped chunk of data 204B read before the matched block of data 202B to the new supplemental file 214B for the new version X+1 of the data file 108, as described above in regard to FIG. 3C. The routine 700 then proceeds from operation 730 to operation 732, where the CDP module 114 appends a corresponding supplemental data reference 212G to the new version map file 210B corresponding to the new version X+1 of the data file 108. The supplemental data reference 212G indicates the length of the skipped chunk of data 204B appended to the new supplemental file 214B in operation 730 above.

From operation 732, the routine 700 proceeds to operation 734, where the CDP module 114 appends a master block reference 212H to the new version map file 210B indicating the matching master block 222B. As described above in regard to FIG. 3C, the index in the master block reference 212H indicates the index of the matching master block 222B in the master file 220, not the index of the master block 222B in the previous version master file 224A maintained on the local storage device 120. The CDP module 114 may determine the index of the matching master block 222B in the master file 220 utilizing the master block reference 212B from the previous version map file 210A corresponding to position of the matching master block 222B in the previous version master file 224A, for example.

The routine 700 then proceeds to operation 736, where the CDP module 114 sets the current offset to the end of the matched block of data 202B read from the data file 108. From operation 736, the routine 700 returns to operation 704, as shown in FIG. 7A, where the CDP module 114 reads the next data block 302 from the data file 108 at the current offset. The process continues until a data block 302 less than a full block is read, indicating the CDP module has processed the entire data file. If, at operation 706, the read data block 302 is less than a full block of data, i.e. smaller than the block size, then the routine 700 proceeds to operation 740, where the CDP module 114 appends the partial data block 302 to the new supplemental file 214B. The routine 700 then proceeds to operation 742, where the CDP module 114 appends a corresponding supplemental data reference 212 to the new version map file 210B indicating the length of the partial data block 302 appended to the new supplemental file 214B in operation 740 above. From operation 742, the routine 700 ends.

According to a further embodiment, after a specified number of versions of the data file 108 have been backed-up to the remote storage 122 utilizing the de-duplication process against the previous version master file 224A described above in regard to FIGS. 3A-3E and 7A-7B, the CDP module 114 may reset the process, such that the next version of the data file is backed-up anew, without de-duplication against a previous version of the file. This process is referred to as reference resetting. After every specified number of versions of the data file 108, the next version is backed-up to the collection of files 128B maintained on the remote storage as if it was the initial version of the file, as shown in FIG. 2 above.

In one embodiment, while no de-duplication of data against a previous version of the data file 108 is performed, the CDP module 114 will utilize new index numbers in master block reference 212 to any new master blocks 222 appended to the master file 220, in order for the master blocks previously stored in the master file to remain valid. In this way, versions of the data file 108 backed-up before the reference resetting was performed may still be restored from the collection of files 128B maintained on the remote storage. In further embodiments, the number of versions between reference resets may be specified by the users or administrators of the user computer 102, and may be less than the total number of versions of the data file 108 retained in the collection of files 128B in the remote storage 122.

Figure 8:
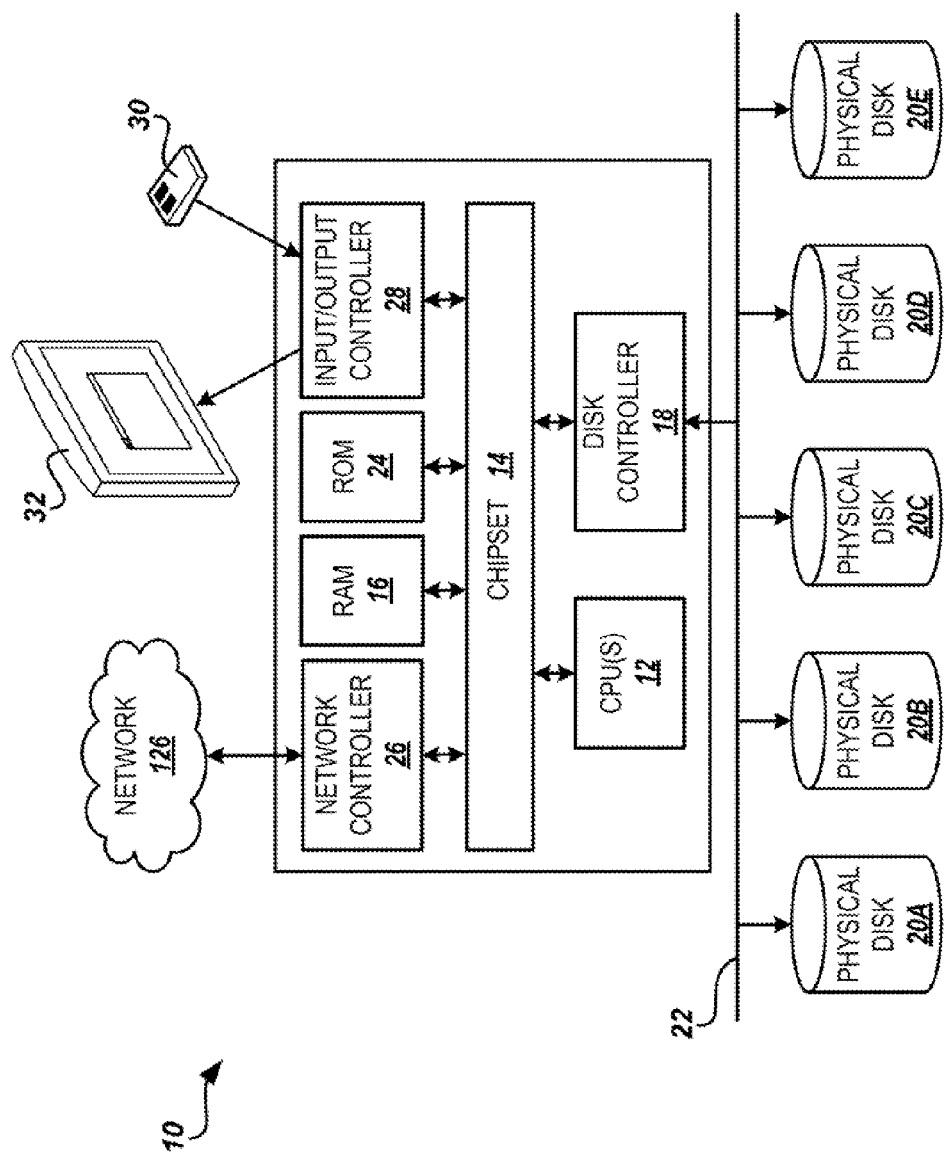
FIG. 8 is a computer architecture diagram illustrating a computer hardware architecture for a computing system capable of implementing aspects of the embodiments presented herein.

FIG. 8 and the following provide a brief, general description of a suitable computing environment in which the embodiments described herein may be implemented. Those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments, where tasks are performed by remote processing devices that are linked through a communications network. In a distributed computing environment, program modules may be located in both local and remote memory storage devices.

In particular, FIG. 8 shows an illustrative computer system 10 for the user computer 102 or other computer systems described herein. In one illustrative embodiment, one or more central processing units ("CPUs") 12 operate in conjunction with a chipset 14. The CPUs 12 are standard programmable processors that perform arithmetic and logical operations necessary for the operation of the computer system 10. The CPUs 12 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 14 provides an interface between the CPUs 12 and the remainder of the computer system 10. The chipset 14 also provides an interface to a random access memory ("RAM") 16 used as the main memory in the computer system 10. The chipset 14 also includes functionality for providing network connectivity through a network controller 26, such as a gigabit Ethernet adapter. The network controller 26 is capable of connecting the computer system 10 to remote storage systems 124 or other computing devices over the network 126, as described above in regard to FIG. 1. The network 126 may be an Ethernet or Gigabyte Ethernet LAN, a fiber ring, a fiber star, wireless, optical, satellite, a WAN, a MAN, the Internet, or any other network technology, topology, protocol, or combination thereof. The network controller 26 may also connect the computer system 10 to other types of networks and remote computing systems.

The computer system 10 may be further connected to a number of mass storage devices, such as physical disks 20A-20E shown in FIG. 5. The disks 20A-20E may provide the data storage capacity required for the computer system 10 to store data files 108 the storage volume 110 and/or the local storage device 120, described above in regard to FIG. 1. A disk controller 18 allows the computer system 10 to communicate with the disks 20A-20E connected to the storage node. According to embodiments, the disks 20A-20E may be connected to the computer system 10 through a bus 22 that allows the disk controller 18 to communicate with the disk drives. The disk controller 18 may interface with the disks 20A-20E through a serial advanced technology attachment ("SATA") interface, a small computer system interface ("SCSI"), a fiber channel ("FC") interface, a serial attached SCSI interface, or other standard interface for physically connecting and transferring data between computers and storage devices.

The computer system 10 may store data on the disks 20A-20E by transforming the physical state of the disk to reflect the information being stored. The specific transformation of physical state may depend on various factors, in different implementations of this description. Examples of such factors may include, but are not limited to, the technology used to implement the storage devices, whether the storage devices are characterized as primary or secondary storage, and the like. For example, the computer system 10 may store data to the disks 20A-20E by issuing instructions to the disk controller 18 to alter the magnetic characteristics of particular locations within the physical disk drives. These transformations may also include altering the physical features or characteristics of other media types, including altering the reflective or refractive characteristics of a particular location in an optical storage device, or modifying the electrical characteristics of a particular capacitor, transistor, or other discrete component in a solid-state storage device. Other transformations of physical media are possible without departing from the scope and spirit of the present description, with the foregoing examples provided only to facilitate this discussion. The computer system 10 may further read information from the physical disks 20A-20E by detecting the physical states or characteristics of one or more particular locations within the devices.

In addition to the disks 20A-20E described above, the computer system 10 may have access to other computer-readable storage media to store and retrieve information, such as program modules, data structures, or other data. It should be appreciated by those skilled in the art that computer-readable storage media includes volatile and non-volatile, removable and non-removable media implemented in any method or technology for the non-transitory storage of data and computer-executable instructions. Computer-readable storage media includes RAM, ROM, EPROM, EEPROM, flash memory or other solid-state memory technology, CD-ROM, DVD, HD-DVD, BLU-RAY, or other optical storage, magnetic cassettes, magnetic tape, magnetic disk storage or other magnetic storage devices, or any other medium which can be used to store the desired information in a non-transitory fashion and which can be accessed by the computer system 10.

For example, the computer-readable storage media may store the operating system 106 utilized to control the operation of the computer system 10. According to one embodiment, the operating system 106 comprises the WINDOWS® operating system from MICROSOFT Corporation of Redmond, Wash. According to further embodiments, the operating system may comprise the LINUX, UNIX, or SOLARIS operating systems. It should be appreciated that other operating systems may also be utilized. The computer-readable storage media may store other system or application programs, such as the local applications 104 or the CDP module 114 described above, as well as other data files utilized by the computer system 10.

In one embodiment, the computer-readable storage medium may be encoded with computer-executable instructions that, when loaded into the computer system 10, may transform the computer system from a general-purpose computing system into special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer system 10 by specifying how the CPUs 12 transitions between states, as described above. According to one embodiment, the computer system 10 may have access to computer-readable storage media storing computer-executable instructions that, when executed by the computer system, perform the routines 600 and 700 for performing data de-duplication of a version of a data file for backup to a remote storage location, described above in regard to FIGS. 6-7B.

The chipset 14 may also provide an interface to a computer-readable storage medium such as a ROM 24 or NVRAM for storing a firmware that includes program code containing the basic routines that help to start up the computer system 10 and to transfer information between elements within the computer system 10. The ROM 24 or NVRAM may also store other software components necessary for the operation of the computer system 10 in accordance with the embodiments described herein.

The chipset 14 may also include or provide an interface to an input/output controller 28. The input/output controller 28 may receive and process input from a number of input devices, including, a mouse 30, a keyboard, a touchpad, a touch screen, an electronic stylus, or other type of input device. Similarly, the input/output controller 28 may provide output to a display device 32, such as a computer monitor, a flat-panel display, a digital projector, a printer, a plotter, or other type of output device. It will be appreciated that the computer system 10 may not include all of the components shown in FIG. 8, may include other components that are not explicitly shown in FIG. 8, or may utilize an architecture completely different than that shown in FIG. 8.

Based on the foregoing, it should be appreciated that technologies for performing data de-duplication of a version of a data file for backup to a remote storage location are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method of backing-up a version of a data file to a remote storage, the method comprising executing instructions on a computer to perform the operations of:

de-duplicating the version of the data file against a previous version master file stored on a local storage device, wherein the previous version master file comprises a single instance of each of one or more unique data blocks of a specific block size from a previous version of the data file, and wherein de-duplicating the version of the data file against the previous version master file comprises determining whether at least one block of data from the version of the data file matches at least one of the one or more unique data blocks of the specific size from the previous version of the data file by:

maintaining a lightweight checksum for each of the one or more unique data blocks in the previous version master file, and matching a block of data read from the version of the data file to one of the one or more unique data blocks in the previous version master file by calculating a lightweight checksum value for the read block of data and comparing the calculated lightweight checksum value with the lightweight checksums maintained for the one or more unique data blocks in the previous version master file, wherein calculating the lightweight checksum for a subsequently read block of data from the version of the data file comprises subtracting one or more bytes from the lightweight checksum for a previously read block of data and adding one or more bytes from the subsequently read block of data to the lightweight checksum for the previously read block of data;

creating a supplemental file corresponding to the version of the data file and comprising one or more chunks of data from the version of the data file not matching one of the one or more unique data blocks in the previous version master file;

creating a version map file corresponding to the version of the data file and comprising one or more references to unique data blocks in the previous version master file and one or more references to chunks of data in the supplemental file, wherein each of the one or more references to unique data blocks in the previous version master file comprise an index to a unique data block and each of the one or more the references to chunks of data in the supplemental file comprise a length of a chunk of data; and storing the supplemental file and the version map file corresponding to the version of the data file to the remote storage, wherein the remote storage contains a master file corresponding to the data file and comprising each of the unique data blocks referenced in the version map file.

2. The computer-implemented method of claim 1, further comprising executing instructions on the computer to perform the operations of:

appending a new unique data block to the master file corresponding to the data file, wherein the new unique data block comprises data of the specific block size not matching one of the one or more unique data blocks in the previous version master file.

3. The computer-implemented method of claim 1, further comprising executing instructions on the computer to perform the operations of:

creating a new version master file corresponding to the version of the data file and replacing the previous version master file stored on the local storage device with the new version master file.

4. The computer-implemented method of claim 1, wherein a plurality of version map files and supplemental files are stored in the remote storage along with the master file corresponding to the data file, each of the plurality of version map files and supplemental files corresponding to individual versions of the data file.

5. The computer-implemented method of claim 4, wherein a plurality of version map files corresponding to individual versions of the data file contain a reference to the same unique data block in the master file.

6. The computer-implemented method of claim 1, wherein after a specified number of versions of the data file have been backed-up to the remote storage, a subsequent version of the data file is backed-up to the remote storage without de-duplicating the subsequent version of the data file against the previous version master file stored on the local storage device.

7. The computer-implemented method of claim 1, wherein the remote storage comprises a cloud-based storage service.

8. A non-transitory computer-readable storage medium having computer-executable instructions stored thereon for de-duplicating a current version of a data file that, when executed by a computer, cause the computer to:

read a first block of data of a particular block size from a current offset in the current version of the data file;

determine if the first block of data matches one of a plurality of unique data blocks contained in a previous version master file corresponding to a previous version of the data file, wherein the previous version master file is stored on a local storage device of the computer, wherein the previous version master file comprises a single instance of each of the plurality of unique data blocks from the previous version of the data file, wherein determining if the first block of data matches one of the plurality of unique data blocks contained in the previous version master file comprises calculating a lightweight checksum value for the first block of data and comparing the calculated lightweight checksum value with lightweight checksums maintained for the plurality of unique data blocks in the previous version master file, and wherein calculating the lightweight checksum for a subsequently read block of data from the current version of the data file comprises subtracting one or more bytes from the lightweight checksum for a previously read block of data and adding one or more bytes from the subsequently read block of data to the lightweight checksum for the previously read block of data;

upon determining that the first block of data matches one of the plurality of unique data blocks contained in the previous version master file, appending a reference to the matching unique data block to a version map file corresponding to the current version of the data file;

upon determining that the first block of data does not match one of the plurality of unique data blocks contained in the previous version master file, creating a supplemental file corresponding to the current version of the data file and comprising a chunk of data from the current version of the data file not matching one of the plurality of unique data blocks contained in the previous version master file, appending a reference to the chunk to the version map file and increasing the current offset by a slide size; and reading a next block of data of the particular block size from the current offset in the current version of the data file, wherein the reference to the matching unique data block comprises an index to the matching unique data block and the reference to the chunk comprises a length of the chunk.

9. The non-transitory computer-readable storage medium of claim 8, wherein the operations are repeated until all the data in the current version of the data file have been processed, and wherein the version map file corresponding to the current version of the data file is then copied to a remote storage containing a master file corresponding to the data file and comprising each of the unique data blocks referenced in the version map file.

10. The non-transitory computer-readable storage medium of claim 9, wherein a plurality of version map files are stored in the remote storage along with the master file corresponding to the data file, each of the plurality of version map files corresponding to individual versions of the data file.

11. The non-transitory computer-readable storage medium of claim 10, wherein a plurality of version map files corresponding to individual versions of the data file contain a reference to the same unique data block in the master file.

12. A system backing-up a version of a data file to a remote storage, the system comprising a continuous data protection ("CDP") module executing on a user computer and configured to:

create a collection of files corresponding to the version of the data file by de-duplicating the version of the data file against a previous version master file stored on a local storage device of the user computer, wherein the previous version master file comprises a single instance of each of one or more unique data blocks of a specific block size from a previous version of the data file, and wherein de-duplicating the version of the data file against the previous version master file comprises determining whether at least one block of data from the version of the data file matches at least one of the one or more unique data blocks of the specific size from the previous version of the data file by:

maintaining a lightweight checksum for each of the one or more unique data blocks in the previous version master file, and matching a block of data read from the version of the data file to one of the one or more unique data blocks in the previous version master file by calculating a lightweight checksum value for the read block of data and comparing the calculated lightweight checksum value with the lightweight checksums maintained for the one or more unique data blocks in the previous version master file, wherein calculating the lightweight checksum for a subsequently read block of data from the version of the data file comprises subtracting one or more bytes from the lightweight checksum for a previously read block of data and adding one or more bytes from the subsequently read block of data to the lightweight checksum for the previously read block of data; and store the collection of files corresponding to the version of the data file to the remote storage, wherein the remote storage contains a master file corresponding to the data file and comprising the one or more unique data blocks in the previous version master file, wherein the collection of file comprises:

a supplemental file corresponding to the version of the data file and comprising one or more chunks of data from the version of the data file not matching one of the one or more unique data blocks in the previous version master file; and a version map file corresponding to the version of the data file and comprising one or more references to unique data blocks in the previous version master file and one or more references to chunks of data in the supplemental file, wherein each of the one or more references to unique data blocks in the previous version master file comprise an index to a unique data block and each of the one or more the references to chunks of data in the supplemental file comprise a length of a chunk of data.

13. The system of claim 12, wherein the CDP module is further configured to:

append a new unique data block to the master file corresponding to the data file, wherein the new unique data block comprises data of the specific block size not matching one of the one or more unique data blocks in the previous version master file.

14. The system of claim 12, wherein the CDP module is further configured to:

create a new version master file corresponding to the version of the data file and replacing the previous version master file stored on the local storage device with the new version master file.

15. The system of claim 12, wherein after a specified number of versions of the data file have been backed-up to the remote storage, a subsequent version of the data file is backed-up to the remote storage without de-duplicating the subsequent version of the data file against the previous version master file stored on the local storage device.

* * * * *